United States Patent
Curry

(10) Patent No.: US 8,688,785 B2
(45) Date of Patent: Apr. 1, 2014

(54) JOINT COMMUNICATION SESSIONS

(75) Inventor: Brian Curry, Burlingame, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 13/223,696

(22) Filed: Sep. 1, 2011

(65) Prior Publication Data

US 2012/0016944 A1    Jan. 19, 2012

Related U.S. Application Data

(63) Continuation of application No. 11/535,565, filed on Sep. 27, 2006, now Pat. No. 8,015,247.

(60) Provisional application No. 60/803,111, filed on May 24, 2006.

(51) Int. Cl.
*G06F 15/16*      (2006.01)

(52) U.S. Cl.
USPC ........................ 709/205; 715/753; 455/518

(58) Field of Classification Search
USPC ............................................... 709/205
See application file for complete search history.

(56) References Cited

U.S. PATENT DOCUMENTS

| | | | |
|---|---|---|---|
| 6,212,548 B1* | 4/2001 | DeSimone et al. | 709/204 |
| 7,685,237 B1* | 3/2010 | Weaver et al. | 709/205 |
| 7,716,289 B2* | 5/2010 | Malik | 709/206 |
| 7,730,149 B2* | 6/2010 | Aaltonen et al. | 709/206 |
| 8,015,247 B1 | 9/2011 | Curry | |
| 2002/0023131 A1 | 2/2002 | Wu et al. | |
| 2002/0023132 A1 | 2/2002 | Tornabene et al. | |
| 2002/0026478 A1 | 2/2002 | Rodgers et al. | |
| 2002/0052919 A1 | 5/2002 | Morris et al. | |
| 2002/0061779 A1* | 5/2002 | Maehiro | 463/42 |
| 2002/0143876 A1 | 10/2002 | Boyer et al. | |
| 2002/0184391 A1* | 12/2002 | Phillips | 709/248 |
| 2002/0186232 A1* | 12/2002 | Watanabe et al. | 345/716 |
| 2003/0009523 A1 | 1/2003 | Lindskog et al. | |
| 2003/0041108 A1 | 2/2003 | Henrick et al. | |
| 2003/0105816 A1 | 6/2003 | Goswami | |
| 2003/0195928 A1* | 10/2003 | Kamijo et al. | 709/204 |
| 2004/0010464 A1* | 1/2004 | Boaz | 705/40 |
| 2004/0019701 A1 | 1/2004 | McGee et al. | |
| 2004/0103149 A1* | 5/2004 | Tanigawa et al. | 709/204 |

(Continued)

OTHER PUBLICATIONS

UnreallRCd Commands (published on Aug. 6, 2003, http://web.archive.org/web/20020806182312/http://www.technerd.net/irc-commands.html.*

(Continued)

*Primary Examiner* — Hamza Algibhah
(74) *Attorney, Agent, or Firm* — Keller Jolley Preece

(57) ABSTRACT

Online communication sessions may be joined in an environment that includes receiving a first communication between a first user and a second user and enabling the rendering of the first communication at devices associated with the first and second users. A second communication between the first user and a third user is received and the rendering of the second communication at devices associated with the first and third users is enabled. After receiving the first and second communications, a trigger to join at least the communication sessions associated with the first, second, and third users is received from the first, second, or third user. Information structured and arranged to render, in a single window, text associated with the first and second communications at the devices associated with the first, second, and third users is generated.

21 Claims, 9 Drawing Sheets

(56) References Cited

U.S. PATENT DOCUMENTS

| | | |
|---|---|---|
| 2004/0107256 A1 | 6/2004 | Odenwald et al. |
| 2004/0162144 A1* | 8/2004 | Loose et al. ............... 463/42 |
| 2004/0186886 A1 | 9/2004 | Galli et al. |
| 2004/0225716 A1* | 11/2004 | Shamir et al. ............. 709/204 |
| 2004/0228531 A1 | 11/2004 | Fernandez et al. |
| 2006/0036703 A1* | 2/2006 | Fulmer et al. ............. 709/207 |
| 2006/0075029 A1* | 4/2006 | Kelso et al. ............... 709/206 |
| 2006/0075121 A1* | 4/2006 | Ludwig et al. ............ 709/227 |
| 2006/0079260 A1* | 4/2006 | Tillet et al. ............... 455/518 |
| 2006/0212583 A1* | 9/2006 | Beadle et al. ............. 709/227 |
| 2006/0218000 A1* | 9/2006 | Smith et al. ................. 705/1 |
| 2006/0239295 A1* | 10/2006 | Rao et al. ................. 370/466 |
| 2006/0242554 A1* | 10/2006 | Gerace et al. ............ 715/501.1 |
| 2006/0265454 A1* | 11/2006 | Forlenza et al. .......... 709/206 |
| 2007/0005704 A1* | 1/2007 | Heron et al. .............. 709/206 |
| 2007/0041366 A1* | 2/2007 | Vugenfirer et al. ....... 370/352 |
| 2007/0055728 A1* | 3/2007 | Shea et al. ................ 709/204 |
| 2007/0111743 A1* | 5/2007 | Leigh et al. ............... 455/518 |
| 2007/0130276 A1* | 6/2007 | Zhang et al. .............. 709/207 |
| 2007/0168444 A1* | 7/2007 | Chen et al. ................ 709/207 |
| 2007/0198647 A1* | 8/2007 | Lingafelt et al. .......... 709/207 |
| 2007/0208809 A1 | 9/2007 | Westman |
| 2013/0173726 A1 | 7/2013 | Curry |

OTHER PUBLICATIONS

U.S. Appl. No. 11/535,565, Mar. 11, 2009, Office Action.
U.S. Appl. No. 11/535,565, Oct. 5, 2009, Office Action.
U.S. Appl. No. 11/535,565, Aug. 12, 2010, Office Action.
U.S. Appl. No. 11/535,565, Nov. 24, 2010, Office Action.
U.S. Appl. No. 11/535,565, May 12, 2011, Notice of Allowance.
U.S. Appl. No. 13/620,566, Jun. 20, 2013, Office Action.
U.S. Appl. No. 13/620,566, Aug. 19, 2013, Office Action.

* cited by examiner

400

Communication Options for Joint Communication With "Mad Chatter" and "Silent Fred" — 410

Options:

- Display communication history of all users chronologically — 420
- Allow all Users to Invite other Users — 430
- Allow Users to send Media — 440
- Setup or invite participant list — 450

FIG. 4

JOINT COMMUNICATION SESSIONS

CROSS-REFERENCE

This application is a continuation of U.S. application Ser. No. 11/535,565, filed Sep. 27, 2006 now U.S. Pat. No 8,015, 247, now allowed, which claims priority from U.S. Provisional Application No. 60/803,111 filed May 24, 2006, which is titled "Joint Communication Session. The contents of the above applications are expressly incorporated herein by reference to their entireties.

TECHNICAL FIELD

This invention relates to personal communication sessions.

BACKGROUND

Individuals may communicate over the Internet using personal communication sessions. An individual communicating with multiple people may use multiple communication sessions.

SUMMARY

In one general aspect, joining online communication sessions includes receiving a first communication between a first user and a second user and enabling the rendering of the first communication at devices associated with the first and second users. A second communication between the first user and a third user is received and the rendering of the second communication at devices associated with the first and third users is enabled. After receiving the first and second communication, a trigger to join at least the communication sessions associated with the first, second, and third users is received from the first, second, or third user. Information structured and arranged to render, in a single window, text associated with the first and second communications at the devices associated with the first, second, and third users is generated.

Implementations may include one or more additional features. For instance, a third communication between the second user and the third user may be received and the rendering of the third communication at the devices associated with the second and third users may be enabled before receiving the trigger. Information structured and arranged to render, in a single window, text associated with the first, second, and third communications at the devices associated with the first, second, and third users may be generated.

Receiving a trigger to join at least the communication sessions between the first, second, and third users may include receiving a trigger to join the communication sessions between the first, second, and third users, and a fourth user, where the fourth user is not involved in a communication session with any of the first, second, or third users. Information structured and arranged to render text associated with the first and second communications at the device associated with the fourth user may be generated.

Enabling the rendering of the first communication session may include generating information structured and arranged to render information associated with the first communication at only either one or both of the devices associated with either the first or second users.

In another general aspect, joining online communication sessions includes sending, from a user to multiple specified users, a trigger to join two or more user-to-user communication sessions which include previous user communications to multiple specified user, into a joint communication session and rendering, at a device associated with the user, the joint communication session including some or all of the text rendered in each of the user communications prior to the sending of the trigger. Future communications directed to the joint communication from users associated with the joint communication are rendered at the device associated with the user.

Implementations may include one or more additional features. For instance, at least one of the communication sessions may not have been rendered at the device prior to the sending of the trigger.

Sending a trigger to join two or more user-to-user communication sessions may include sending a trigger configured to establish a joint communication in which at least some of the text associated with each previous user communication is included in the rendered joint communication. The trigger may be configured to establish a joint communication in which at least some of the text associated with each previous user communication involving the first user is included in the rendered joint communication. The trigger also may be configured to establish a joint communication in which none of the text of previous user communications is included in the rendered joint communication, or to establish a joint communication in which users not included in the user-to-user communication sessions are enabled to be included in the joint communication.

Users not included in the user-to-user communication sessions may be enabled to be included in the joint communication after the joint communication is rendered. Sending a trigger to join two or more user-to-user communication sessions may include sending a trigger configured to establish a joint communication in which a user may send media content to be rendered with the joint communication session.

User communications in the joint communication may be rendered in chronological order. A chronological indication between user communications occurring before establishment of the joint communication and those occurring after establishment of the joint communication may be rendered.

In a further general aspect, an article includes a computer-readable medium having encoded thereon software instructions for enabling the establishment and rendering of a joint communication at joint communication users, where the joint communication includes text associated with user-to-user communications which were originally sent from and to the joint communication users, and text associated with a first communication sent from any of the joint communication users. The instructions also cause the computer to enable the establishment and rendering of the joint communication to an additional user, after the sending of the first communication, where that joint communication includes text associated with user-to-user communications which were originally sent from and to the joint communication users, text associated with a user-to-user communication between a user of the joint communication and the additional user communication, and text associated with the first communication sent from any of the joint communication users.

Implementation may include one or more additional features. For instance, the instructions may enable text associated with communications in the joint communication to be rendered in chronological order. The instructions also may enable the joint communication to include a chronological indication between text associated with communications before the establishment of the joint communication and text associated with communications after the establishment of the joint communication.

Further, the instructions may enable the joint communication users to be connected to the Internet using multiple communication programs or to be closed for all users by the selection of an option to cancel by one of the joint communication users.

The details of one or more implementations are set forth below. Other features and advantages will be apparent from the description and drawings, and from the claims.

DESCRIPTION OF DRAWINGS

FIG. 4 is an exemplary graphical user-interface of a communication options window for joint communications.

Like reference symbols in the various drawings indicate like elements.

DETAILED DESCRIPTION

Personal communication software enables a user to send communications (e.g., text messages) over the Internet to a specified recipient in a live format. Since personal communications are not broadcasted publicly, they offer privacy to users. Also, since personal communication may be initiated by typing or clicking on a username, they are a relatively quick and easy method of communication with specified users.

Users may wish to communicate with multiple users in a personal communication environment. For example, a user may wish to engage in private communication with two other users such that all text messages are seen concurrently by all parties. Further, the user may wish to specify the other included users. This may be accomplished by enabling a user of personal communication programs (e.g., AOL Instant Messenger) to join multiple personal communications (e.g., instant messages or IMs) into a joint communication.

Figure 1:
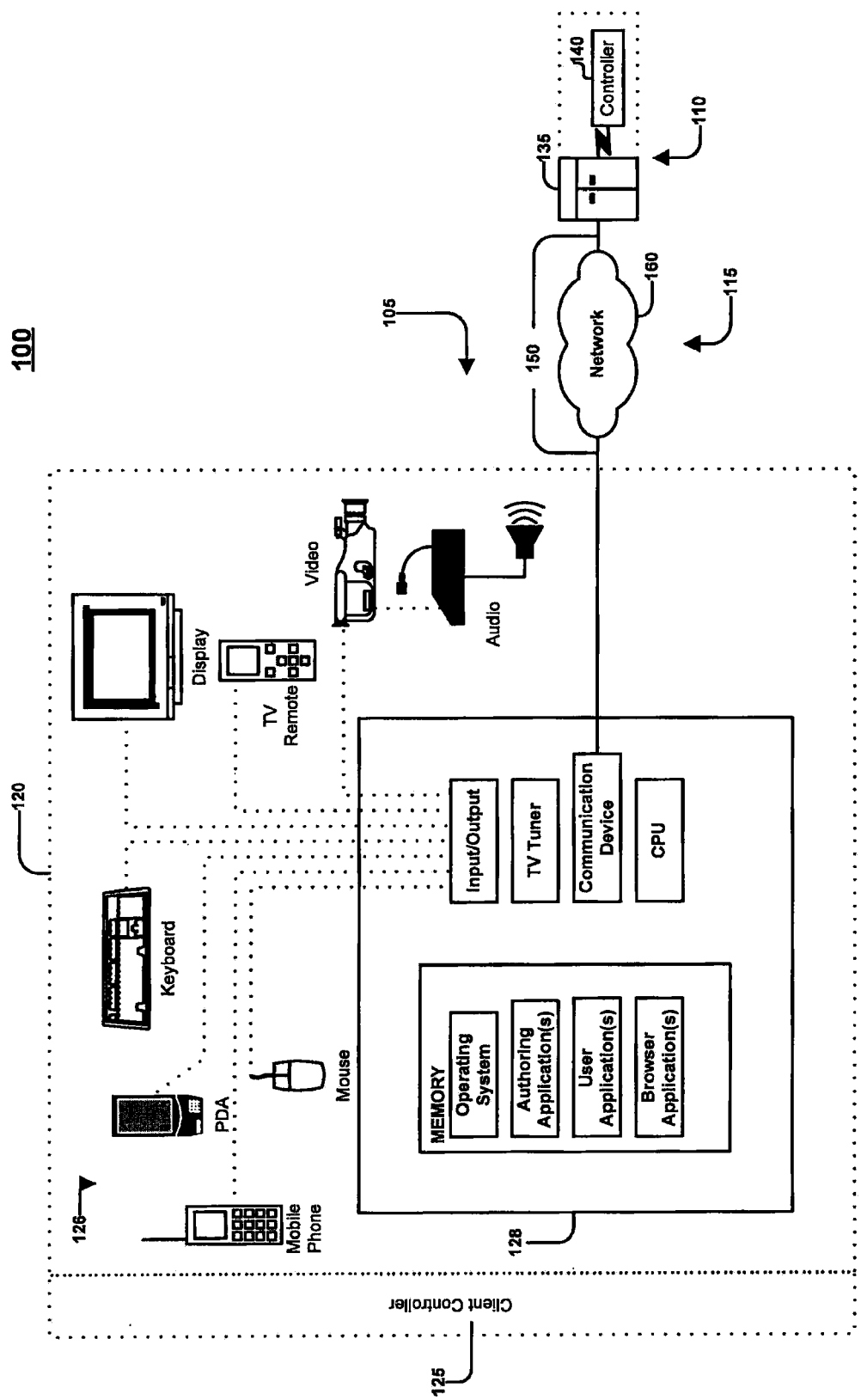
FIG. 1 is a block diagram of a communication system.

FIG. 1 illustrates a communications system 100 including a first communication participant system 105 communicating with a host system 110 through a communications link 115. The first communications participant system 105 typically includes one or more user devices 120 and/or user controllers 125, and the host system 110 typically includes one or more host devices 135 and/or host controllers 140. For example, the first communications participant system 105 or the host system 110 may include one or more general-purpose computers (e.g., personal computers), one or more special-purpose computers (e.g., devices specifically programmed to communicate with each other and/or the first communications participant system 105 or the host system 110), or a combination of one or more general-purpose computers and one or more special-purpose computers. The first communications participant system 105 and the host system 110 may be arranged to operate within or in concert with one or more other systems, such as, for example, one or more LANs ("Local Area Networks") and/or one or more WANs ("Wide Area Networks").

The user device 120 and the host device 135 are generally capable of executing instructions under the command of, respectively, the user controller 125 and the host controller 140. The user device 120 and the host device 135 are connected to, respectively, the user controller 125 and the host controller 140 by, respectively, wired or wireless data pathways 130 and 145, which are capable of delivering data.

The user device 120, the user controller 125, the host device 135, and the host controller 140 typically each include one or more hardware components and/or software components. An example of a user device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The user device 120 and the host device 135 may include devices that are capable of establishing peer-to-peer communications.

An example of user controller 125 or host controller 140 is a software application loaded on the user device 120 or the host device 135 for commanding and directing communications enabled by the user device 120 or the host device 135. Other examples include a program, a piece of code, an instruction, a device, a computer, a computer system, or a combination of these for independently or collectively instructing the user device 120 or the host device 135 to interact and operate as described. The user controller 125 and the host controller 140 may be embodied permanently or temporarily in any type of machine, component, physical or virtual equipment, or storage medium capable of providing instructions to the user device 120 and the host device 135.

The communications link 115 typically includes a delivery network 160 that provides direct or indirect communication between the first communications participant system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and a type of Digital Subscriber Line (DSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

The first communication participant system 105 includes a user device that typically includes a general-purpose computer 128 having an internal or external memory for storing data and programs such as an operating system (e.g., Windows XP™, Windows NT™, OS/1, or Linux) and one or more application programs. Examples of application programs include authoring applications (e.g., word processing programs, database programs, spreadsheet programs, or graphics programs) capable of generating documents or other electronic content; user applications (e.g., America Online (AOL) client, AOL Instant Messenger (AIM) client, interactive television (ITV) client, Internet Service Provider (ISP) client, communication client or personal communications (IM) client) capable of communicating with other computer 128 users, accessing various computer 128 resources, and viewing, creating, or otherwise manipulating electronic content; and browser applications (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage of the general-purpose computer 128. Alternatively, in another implementation, the user controller 125 may access application programs externally stored in and/or performed by one or more device(s) external to the general-purpose computer 128.

The general-purpose computer 128 also includes a central processing unit (CPU) for executing instructions in response to commands from the user controller 125, and a communication device for sending and receiving data. One example of the communication device is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 128 optionally includes a television ("TV") tuner for receiving television programming in the form of broadcast, satellite, and/or cable TV signals. The TV tuner permits the user device 120 to selectively and/or simultaneously display network content received by communications device and TV programming content received by the TV tuner.

The general-purpose computer 128 may include an input/output interface that enables wired or wireless connection to various peripheral devices 126. Examples of peripheral devices 126 include, but are not limited to, a mouse, a mobile phone, a personal digital assistant (PDA), an MP3 player (not shown), a keyboard, a display monitor with or without a touch screen input, a TV remote control for receiving information from and rendering information to users, and an audio-visual input device.

Although FIG. 1 illustrates devices such as a mobile telephone, a PDA, and a TV remote control as being peripheral with respect to the general-purpose computer 128, in another implementation, such devices may themselves include the functionality of the general-purpose computer 128 and operate as the user device 120. For example, the mobile phone or the PDA may include computing and networking capabilities and function as a user device 120 by accessing the delivery network 160 and communicating with the host system 110. Furthermore, the first communication participant system 105 may include one, some or all of the components and devices described above.

Figure 2:
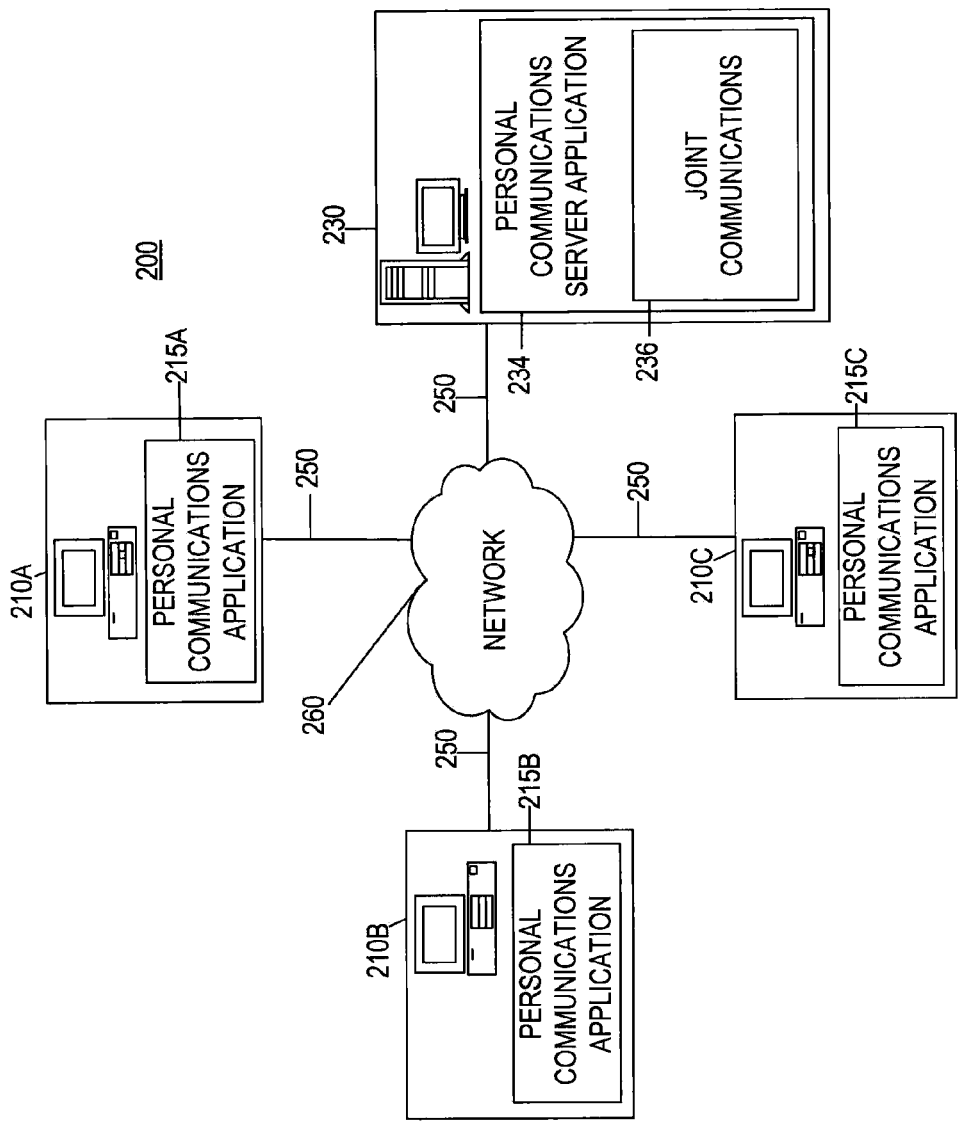
FIG. 2 is a block diagram of a communication system with multiple users.

Referring to FIG. 2, a networked computing environment 200 supports communications between computer users. Users of the networked computing environment 200 are distributed geographically and communicate using user systems 210A-210C. Each of the user systems 210A-210C may be implemented using a user device 120 of FIG. 1, or using another device. The user systems 210A-210C are shown as including, respectively, personal communications applications 215A-215C. A delivery network 260 interconnects the user systems 210A-210C. The delivery network 260 may be the delivery network 160 of FIG. 1, or another network. The user systems 210A-210C are connected to the delivery network 260 through communication pathways 250. A host system 230 also may be connected to the delivery network 260 and may be used to facilitate some direct or indirect communications between the user systems 210A-210C. The host system 230 may be the host system 110 of FIG. 1, or another system. The host system 230 includes a personal communications server application 234.

User systems 210A-210C and the host system 230 include a communications interface (not shown) used by the communications programs to send communications through the delivery network 260. The communications may include e-mail, audio data, video data, general binary data, or text data (e.g., encoded in American Standard Code for Information Interchange (ASCII) format). User systems also include one or more input devices, such as a keyboard, a mouse, a stylus, or a microphone, as well as one or more output devices, such as a monitor, a touch screen, speakers, or a printer.

The personal communications applications 215A-215C include participant lists that include communications identities (e.g., "buddies" in AOL) with which instant messages are exchanged using the respective user systems 210A-210C. More particularly, the personal communications applications 215A-215C include a participant list for each user that uses the user systems 210A-210C to send and receive instant messages. The personal communications applications 215A-215C enable the users to send and receive instant messages with the user systems 210A-210C. Instant messages are sent between users of the user systems 210A-210C through the personal communications server application 234 on the host system 230. The personal communications server application 234 routes instant messages sent with the personal communications applications 215A-215C. The joint communication component 236 may route joint communications from a single user system to multiple user systems 210A-210C.

The networked computing environment 200 may be structured and arranged differently. For example, the personal communications applications 215A-215C may be remotely accessed by the user systems 210A-210C. For example, the applications 215A-215C may be stored on the host system 230 and accessed from there.

Figure 3:
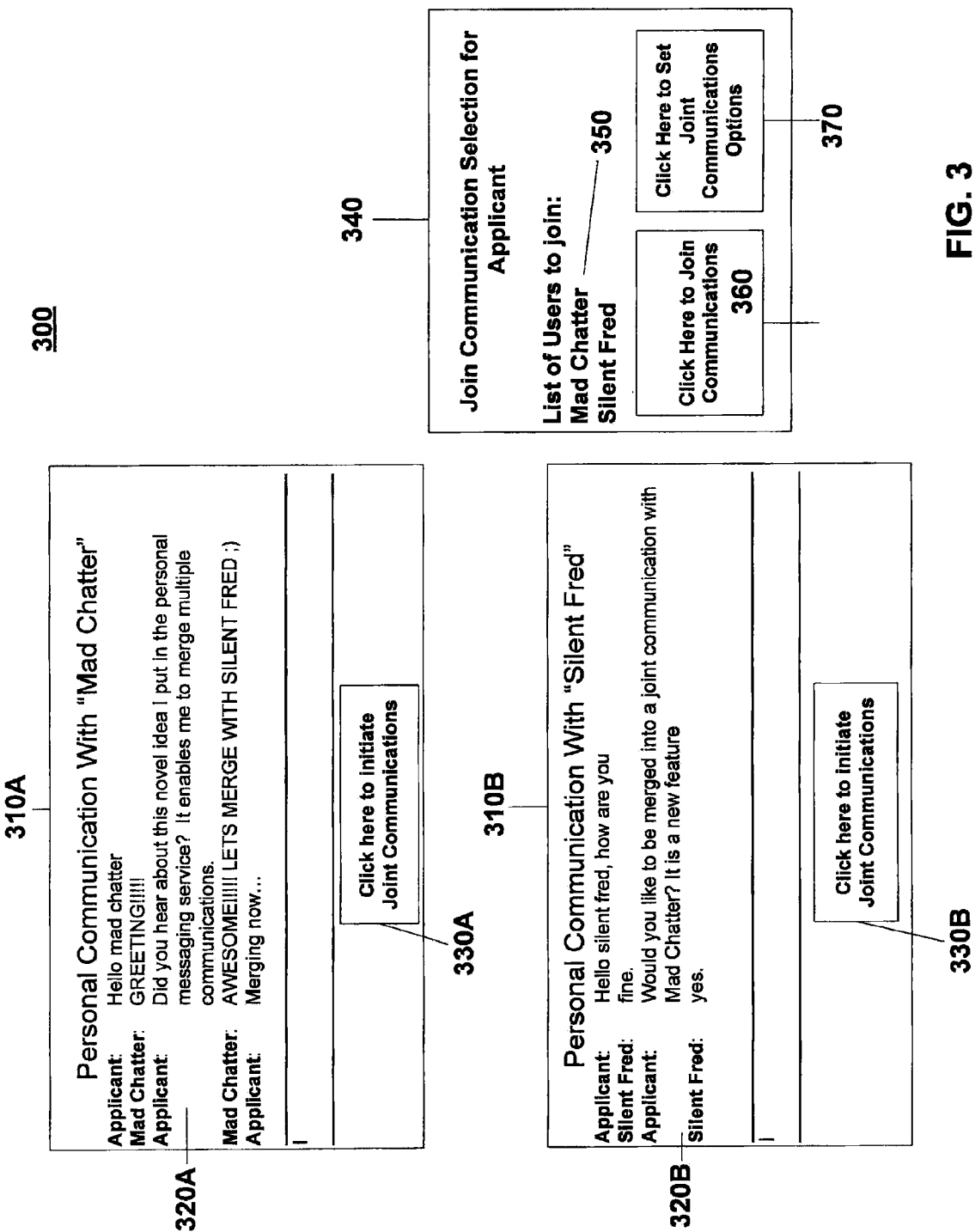
FIG. 3 is an exemplary graphical user-interface including personal communications and a joint communications selection window.

Referring to FIG. 3, an exemplary GUI 300 includes personal communications 310A and 310B and a joint communication selection window 340. The GUI 300 may be displayed using the system 200 shown in FIG. 2, or another system. The GUI 300 is a screen shot of the interface shown when a user ("Applicant") who is engaged in personal communications concurrently with "Mad Chatter" and "Silent Fred" initiates a joint communication.

The personal communications 310A and 310B include communication text 320A and 320B and initiate joint communication options 330A and 330B. The personal communications 310A and 310B enable users to send and receive text messages in a live format. The text messages are displayed as communication text 320A and 320B. The initiate joint communication options 330A and 330B enable the user to join multiple personal communications where, for each user, the communication text for all users is shown in a single window. When activated, the initiate joint communication options 330A and 330B trigger display of the joint communication window 340. Various implementations may include personalized features in the personal communications 310A and 310B. For example, a user specific icon or color may be included in the body of the personal communications 310A and 310B.

The joint communication selection window 340 enables a user to input one or more users to be included in the joint communication. The window 340 includes an adjustable list of users 350, an option to join communications 360, and an option to set joint communication options 370. By adding or subtracting users from the adjustable list 350, the initiating user selects which users are to be included in the joint communication. The option to join communications 360 initiates the rendering of the joint communication for the included users. The option to set communication options 370 provides access to a window configured to enable joint communications options to be set.

The previous description is an example implementation of a GUI including personal communications and an option to join the personal communications. Other implementations may be organized differently or may include other features. For example, multiple personal communications may be separately displayed in a single window including tabs, such that the tab selected determines the personal communication displayed in front.

Referring to FIG. 4, an exemplary GUI 400 of a communication options window 410 may be displayed in response to selection of the option to set joint communication options 370 of FIG. 3.

The communication options window 410 includes options 420-450 that enable a user to set characteristics of the joint communication. A communication history option 420 enables a user to select whether to include previous personal "one-on-one" communications between the users of the joint communication in the communication text of the joint communication. In one implementation, the communication history option 420 enables the user to include previous personal communications of some, but not all, users. The communication history option 420 may enable a setting which will display, for each user, all previous communications involving the user, in the communication text of the joint communication. An invitation option 430 enables users to invite additional users into the established joint communication. A media option 440 enables a user to include media in the joint communication (e.g., a user may send a picture that is displayed in the communication text of the joint communication of some or all of the joint communication users). Further, an option enabling a creation or setup of a previously created list may be included. For example, the option may include inviting a participate list 450 (e.g., an AOL "Buddy List"), automatically inviting all or some individuals in the list.

The previous description is an example implementation of a GUI including a communication options window. Other implementations may be organized differently or may include other features. For example, in various implementations, an option enabling users to invite additional users associated with third-party communication software may be included.

Figure 5A:
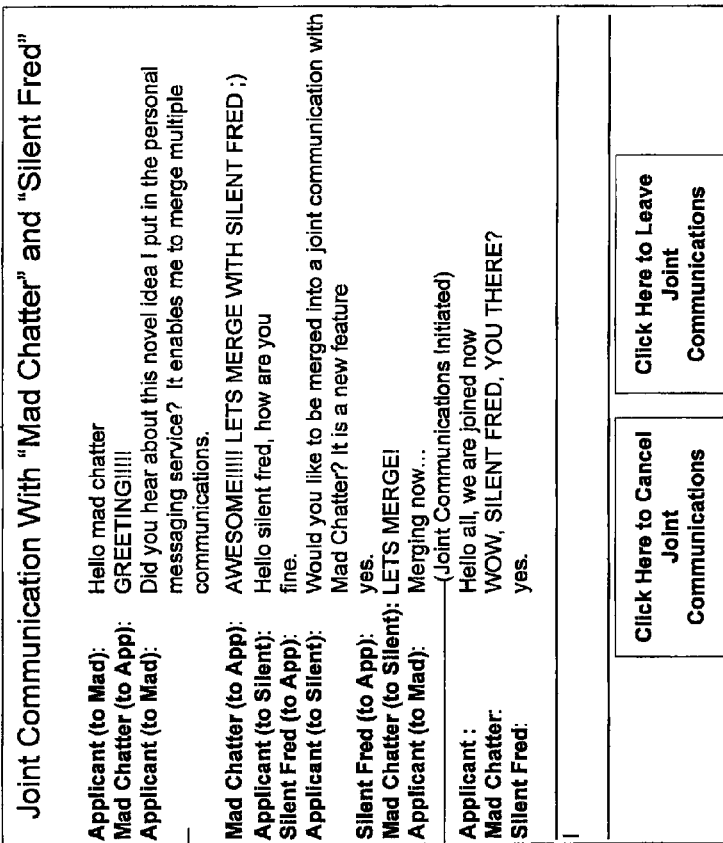
FIGS. 5A, 5B, and 5C are exemplary graphical user-interfaces of joint communications.

Referring to FIG. 5A, an exemplary GUI 500 of a joint communication 510 presented to the initiating user ("Applicant") may be displayed in response to a selection of the option to join communications 360 in FIG. 3. The joint communication 510 includes communication text history 515, a joining indication 525, joint communication text 530, an option to cancel the joint communication 535, and an option to leave the joint communication 540. In the GUI 500, the communication history option 420 has been selected to include all previous personal communications that are between any users included in the joint communication 510. As such, the communication text history 515 that is between Applicant and the other users ("Silent Fred" and "Mad Chatter") is included, and any communication text history between the other included users 520, though not involving Applicant, is also included. This option enables one user of the joint communication 510 to view messages between the other users from before the joint communication 510 is initiated.

The joining indication 525 marks the chronological point at which the joint communication 510 was formed. Communication text history 515 may be distinguished from the joint communication text 530 using the joining indication 525. In other implementations, the communication text history 515 may be shown visually differentiated from the joint communication text 530 by use of a different color, font, size, or other feature, along with, or as an alternative to, the joining indication 525.

The joint communication text 530 includes communications sent by users after the establishment of the joint communication. The sent communications are displayed in the order received. The option to cancel the joint communication 535 enables a user to cancel the joint communication for all users. In one implementation, all users are offered the option to cancel the joint communication 535, in other implementations, only the initiating user is offered the option 535. The option to leave the joint communication 540 enables a user to exit the joint communication without canceling the joint communication 510.

Figure 5B:
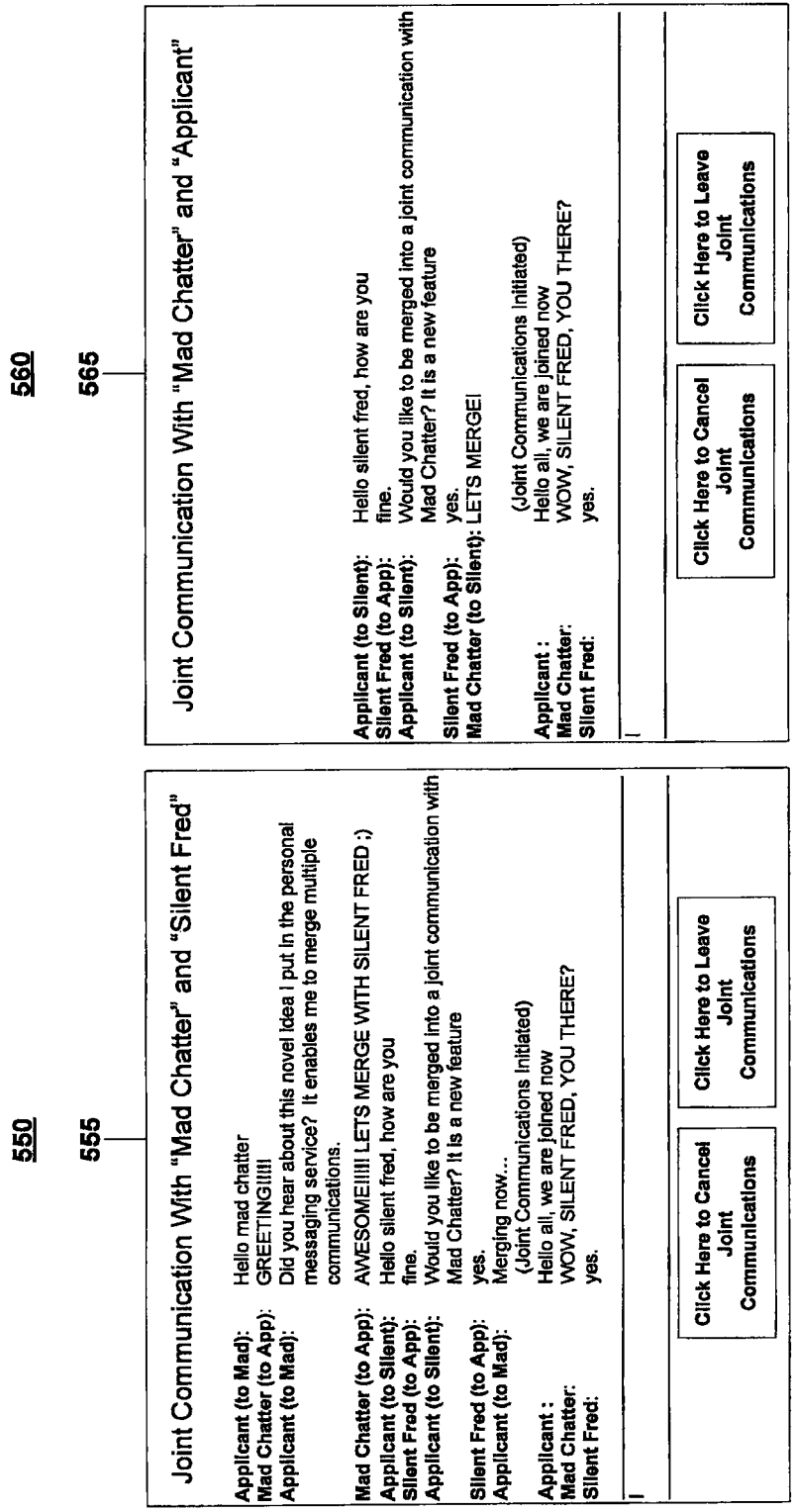

Referring to FIG. 5B an exemplary GUI 550 of a joint communication 555 presented to "Applicant" and an exemplary GUI 560 of a joint communication 565 presented to "Silent Fred" may be displayed in response to a selection of the option to join communications 360 in FIG. 3. In the GUIs 550 and 560, the communication history option 420 has been selected to include all previous personal communications that are between the viewing user and another user of the joint communication.

In the joint communication 555 presented to Applicant, the communication text history that is between Applicant and the other users "Silent Fred" and "Mad Chatter" is included and the communication history that is between only the other users is not included. In the joint communication 565 presented to Silent Fred, the communication text history that is between Silent Fred and the other users "Applicant" and "Mad Chatter" is included and the communication history that is between only the other users is not included. This option enables messages to remain private such that they may only be viewed by the originally intended recipients.

Figure 5C:
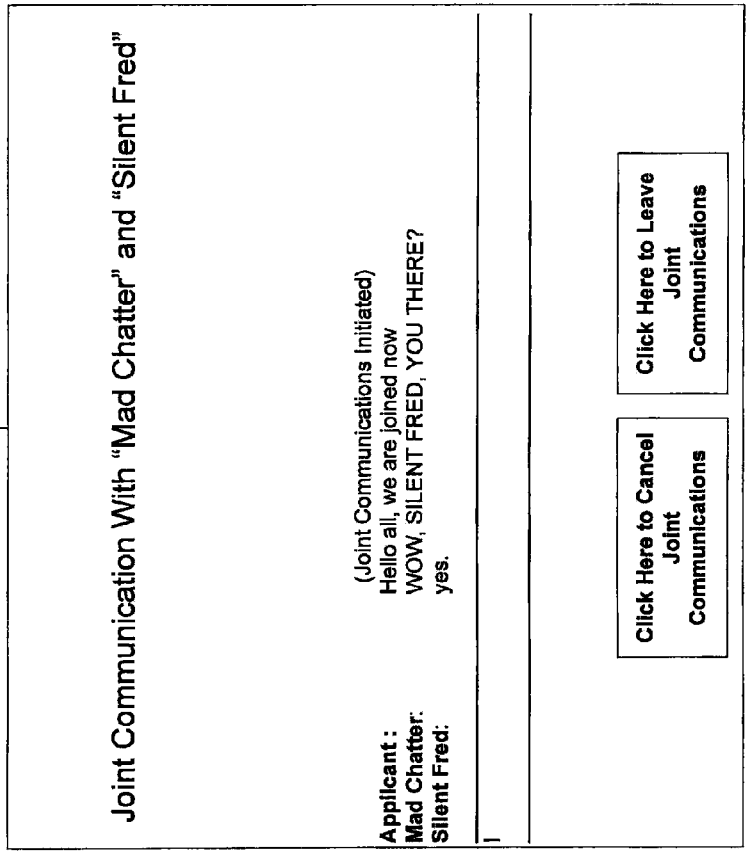

Referring to FIG. 5C an exemplary GUI 580 of a joint communication 585 may be displayed in response to a selection of the option to join communications 360 in FIG. 3. In the GUI 580, the communication history option 420 has been selected such that no communication history is included.

The previous descriptions illustrate example implementations of GUIs including a joint communication. Other implementations may be organized differently or may include other features. For example, in various implementations, the joint communication includes user specific attributes, such as for example, user-specific icons or text colors. Also, joint communication text may first be grouped by user, then grouped chronologically.

Figure 6A:
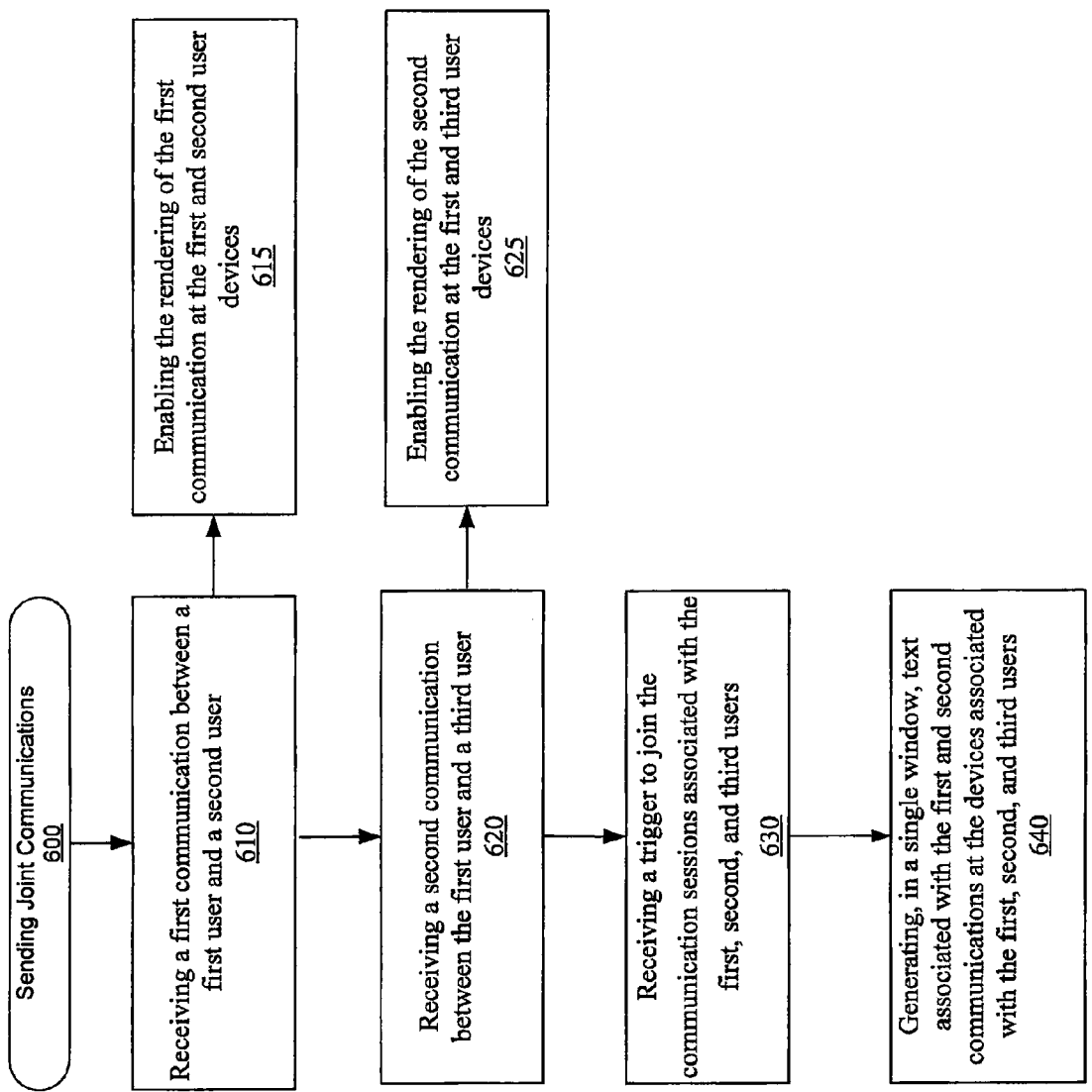
FIGS. 6A and 6B are exemplary flow charts of processes to send joint communications.

Referring to FIG. 6A, an exemplary process 600 to send joint communications is shown. The process 600 may be implemented on the system 200 of FIG. 2, or another system. The process 600 begins when a first communication between a first user and a second user is received (610). The first communication may be a live, text-based communication from a user to a remote second user, such as, for example, an AOL instant message. The first communication may be received by a server coordinating and/or directing communications between users. In response to receiving the first communication, the rendering of the first communication at the first and second user devices is enabled (615). In one implementation, rendering is enabled by forwarding data associated with the first communication to one or both of the devices associated with the first and second users. In another implementation, the rendering is enabled by forwarding the first communication itself.

A second communication between the first user and a third user is received (620). In response to the second communication, the rendering of the second communication at the first and third user devices is enabled (625).

A trigger to join the communication sessions associated with the first, second, and third users is received (630). The trigger may be sent in response to a user selecting an option to merge multiple communication sessions, and may include an identification of the communication sessions to merge. In response to receipt of the trigger, text associated with the first and second communications is generated in a single window at the devices associated with the first, second, and third users (640).

The previous description is an example implementation of a process for sending joint communications. Other implementations may be organized differently or may include other features. For example, in various implementations, users are not required to engage in personal communications to initiate joint communications. Also, joint communication options may be fixed, which enables users to bypass selection options.

Figure 6B:
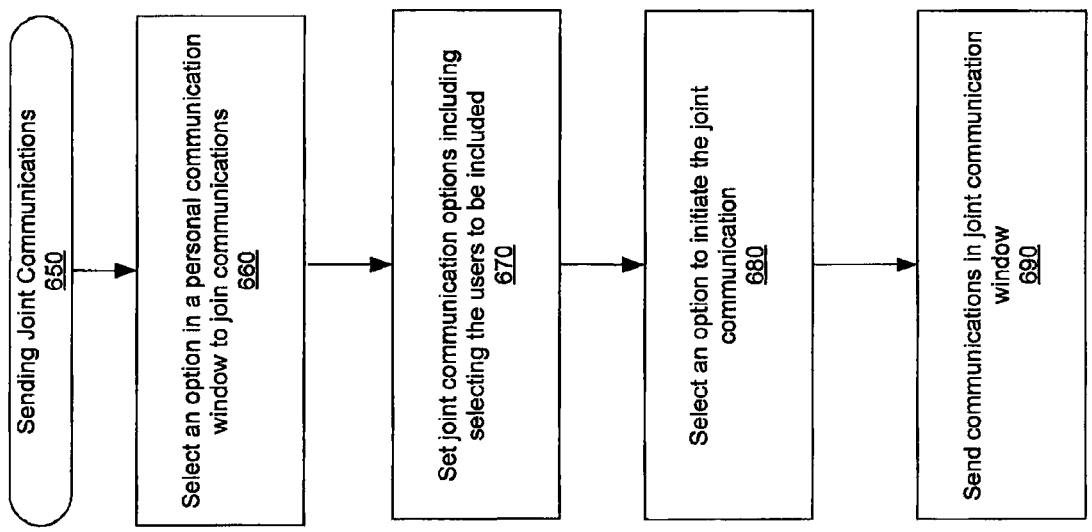

Referring to FIG. 6B, an exemplary process 650 to send joint communications may be implemented on the system 200 of FIG. 2, or another system. The process 650 begins when a user selects an option in a personal communication window to join communications (660). Selecting the option may include clicking an icon displayed concurrent with communication text in a personal communication window.

The user sets the joint communication options including selecting the users to be included (670). Setting the joint communication options may include selecting options within a personal communications window, or within another window. Selecting users to be included may include selecting from a list of users actively engaged in personal communications with the initiating user.

The user selects an option to initiate the joint communication (680). The joint communication is rendered in response to selecting the option to initiate. The user sends communications within the joint communication window (690).

The previous description is an example implementation of a process for sending joint communications. Other implementations may be organized differently or may include other features. For example, in various implementations, users are not required to engage in personal communications to initiate joint communications. Also, joint communication options may be fixed, enabling users to bypass selection options. Further, additional user and communications may be merged into a joint communication A number of implementations have been described. Nevertheless, it will be understood that various modifications may be made without departing from the spirit and scope of the application.

What is claimed is:

1. A computer-implemented method comprising:
   transmitting instructions for displaying a first instant messaging session, the first instant messaging session including one or more first instant messages between a first source and second source, wherein the first instant messaging session is displayed in a single window on a device associated with the first source and on a device associated with the second source;
   transmitting instructions for displaying a second instant messaging session, the second instant messaging session including one or more second instant messages between the first source and a third source, wherein the second instant messaging session is displayed in a single window on the device associated with the first source and on a device associated with the third source;
   receiving from the first source a request to join the first instant messaging session and the second instant messaging session into a combined instant messaging session;
   upon receiving the request to join, establishing a combined instant messaging session and transmitting instructions to display some or all of the one or more first instant messages and the one or more second instant messages in a single window on the devices associated with the first source, the second source and the third source;
   providing an option to each of the first source, the second source and the third source to cancel the combined instant messaging session for all participants; and
   providing an option to each of the first source, the second source and the third source to leave the combined instant messaging session without canceling the combined instant messaging session for all remaining participants.

2. The method of claim 1, further comprising:
   transmitting instructions for providing a second option, the second option comprising a communication history option to view all messages exchanged between the other sources in the first instant messaging session and the second instant messaging session that occurred prior to the combined instant messaging session being established;
   upon receiving a selection of the joint communication option from at least one of the first source, the second source or the third source, displaying all of the first instant messages and the second instant messages in a single window on the devices associated with the first source, the second source and the third source.

3. The method of claim 2, further comprising:
   transmitting instructions for providing a third option to cancel the communication history option; and
   upon receipt of a request to cancel the communications history option from any one of the first source, the second source or the third source, transmitting instructions for restricting viewing of instant messages exchanged prior to the establishment of the combined instant messaging session to the originally intended recipients only.

4. The method of claim 1, further comprising:
   transmitting instructions for displaying a second option enabling the first source to prohibit the second source from sending a media file in the combined instant messaging session; and
   receiving a selection of the second option by the first source.

5. The method of claim 1, further comprising transmitting instruction for visually distinguishing, within the single window, the display of the first and second instant messaging sessions from the display of the combined instant messaging session.

6. The method of claim 1, further comprising:
   determining whether one or more third instant messages from a fourth source are authorized to join the combined instant messaging session; and
   transmitting instructions for displaying the one or more third instant messages within the window only when the fourth source is allowed to join the combined instant messaging session.

7. The method of claim 1, further comprising:
   transmitting instructions to display the first instant messaging session in a first format;
   transmitting instructions to display the second instant messaging session in a second format that is different from the first format; and
   transmitting instructions to display the combined instant messaging session in a third format that is different from the first format and the second format.

8. The method of claim 7, wherein the first format, the second format and the third format include at least one of different text fonts, different text sizes, and different text colors.

9. The method of claim 1, further comprising transmitting instructions to display a joining indication within the single window when the one or more second instant messages between the first source and the third source are authorized to join the combined instant message session.

10. The method of claim 1, further comprising transmitting instructions to display the one or more first instant messages and the one or more second instant messages in a chronological order.

11. The method of claim 1, further comprising transmitting instructions for displaying an icon within the single window, and in response to a selection of the icon, changing a setting of at least one of the first instant messaging session, the second instant messaging session or combined instant messaging session.

12. A non-transitory computer-readable storage medium comprising instructions, which when executed on a processor causes the processor to perform a method comprising:
   transmitting instructions for displaying a first instant messaging session, the first instant messaging session including one or more first instant messages between a first source and a second source, wherein the first instant messaging session is displayed in a single window on a device associated with the first source and on a device associated with the second source;
   transmitting instructions for displaying a second instant messaging session, the second instant messaging session including one or more second instant messages between the first source and a third source, wherein the second instant messaging session is displayed in a single window on the device associated with the first source and on a device associated with the third source;
   receiving from the first source a request to join the first instant messaging session and the second instant messaging session into a combined instant messaging session;
   upon receiving the request to join, establishing a combined instant messaging session and transmitting instructions to display some or all of the one or more first instant messages and the one or more second instant messages in a single window on the devices associated with the first source, the second source and the third source;
   providing an option to each of the first source, the second source and the third source to cancel the combined instant messaging session;
   upon receipt of a request to cancel, cancelling the combined instant messaging session and transmitting instructions for restoring the first instant messaging session and the second instant messaging session;
   providing an option to each of the first source, the second source and the third source to cancel the combined instant messaging session; and
   upon receipt of a request to cancel, cancelling the combined instant messaging session for all remaining participants.

13. The computer-readable storage medium of claim 12, further comprising:
   transmitting instructions for displaying a second option enabling the first source to prohibit the second source from sending a media file in the combined instant messaging session; and
   receiving a selection of the second option by the first source.

14. The computer-readable storage medium of claim 12, further comprising transmitting instructions for visually distinguishing, within the single window, the display of the first instant messaging session from the display of the combined instant messaging session.

15. The computer-readable storage medium of claim 12, further comprising:
   determining whether one or more third instant messages from a fourth source are authorized to join the combined instant messaging session; and
   transmitting instructions for displaying the one or more third instant messages within the window only when the fourth source is allowed to join the combined instant messaging session.

16. The computer-readable storage medium of claim 12, further comprising:
   transmitting instructions to display the first instant messaging session in a first format;
   transmitting instructions to display the second instant messaging session in a second format that is different from the first format;
   transmitting instructions to display the combined instant messaging session in a third format that is different from the first format and the second format.

17. An apparatus for displaying multiple instant messaging sessions in a single window, wherein a first source and a second source exchange one or more first instant messages in a first instant messaging session and wherein the first source and a third source exchange one more second instant messages in a second instant messaging session, the apparatus comprising:
   a memory device storing instructions; and
   a processor executing the instructions to:
   transmit instructions for displaying a first option enabling the first source to request to join the first instant messaging session and the second instant messaging session;
   upon receiving the request to join, establishing a combined instant messaging session and transmitting instructions to display some or all of the one or more first instant messages and the one or more second instant messages in a single window on the devices associated with the first source, the second source and the third source;
   providing an option to each of the first source, the second source and the third source to cancel the combined instant messaging session for all participants; and
   providing an option to each of the first source, the second source and the third source to leave the combined instant messaging session without canceling the combined instant messaging session for all remaining participants.

18. The apparatus of claim 17, wherein the processor:
   transmits instructions for displaying a second option enabling the first source to prohibit the second source from sending a media file in the combined instant messaging session; and
   receives a selection of the second option by the first source.

19. The apparatus of claim 17, wherein the processor:
   determines whether one or more third instant messages from a fourth source are authorized to join the combined instant messaging session; and
   transmits instructions for displaying the one or more third instant messages within the window only when the fourth source is allowed to join the combined instant messaging session.

20. The computer-readable storage medium of claim 12, further comprising:
   transmitting instructions for providing a second option, the second option comprising a communication history option to view all messages exchanged between the other sources in the first instant messaging session and the second instant messaging session that occurred prior to the combined instant messaging session being established;

upon receiving a selection of the joint communication option from at least one of the first source, the second source or the third source, displaying all of the first instant messages and the second instant messages in a single window on the devices associated with the first source, the second source and the third source.

21. The computer-readable storage medium of claim 20, further comprising:

transmitting instructions for providing a third option to cancel the communication history option; and upon receipt of a request to cancel the communications history option, from any one of the first source, the second source or the third source, transmitting instructions for restricting viewing of instant messages exchanged prior to the establishment of the combined instant messaging session to the originally intended recipients only.

\* \* \* \* \*

UNITED STATES PATENT AND TRADEMARK OFFICE
CERTIFICATE OF CORRECTION

| | | |
|---|---|---|
| PATENT NO. | : 8,688,785 B2 | Page 1 of 1 |
| APPLICATION NO. | : 13/223696 | |
| DATED | : April 1, 2014 | |
| INVENTOR(S) | : Brian Curry | |

It is certified that error appears in the above-identified patent and that said Letters Patent is hereby corrected as shown below:

In the Claims:

Column 12, line 16, please replace "the first format;" with --the first format; and--.

Signed and Sealed this
Twenty-sixth Day of January, 2016

Michelle K. Lee
*Director of the United States Patent and Trademark Office*